Figure 3:
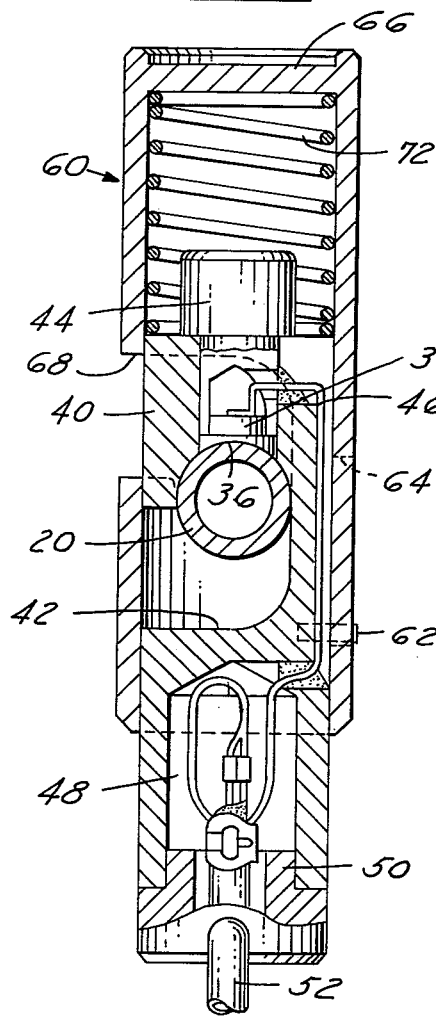

United States Patent [19]
Amrine et al.

[11] 4,091,672
[45] May 30, 1978

[54] TEMPERATURE PROBE AND CONNECTOR

[75] Inventors: Bruce A. Amrine; Philip J. Teders, both of Ann Arbor, Mich.

[73] Assignee: Sarns, Inc., Ann Arbor, Mich.

[21] Appl. No.: 804,948

[22] Filed: Jun. 9, 1977

[51] Int. Cl.² .......................... G01K 1/16; G01K 13/02
[52] U.S. Cl. ..................................... 73/343 R; 73/349; 285/47
[58] Field of Search ................. 73/343 R, 343 B, 347, 73/349; 128/2 H, DIG. 4; 285/47; 138/104

[56] References Cited

U.S. PATENT DOCUMENTS

| | | | |
|---|---|---|---|
| 2,737,050 | 3/1956 | Moninger | 73/343 |
| 3,779,079 | 12/1973 | Snook | 73/349 |

FOREIGN PATENT DOCUMENTS

| | | | |
|---|---|---|---|
| 773,130 | 8/1934 | France | 73/343 |

*Primary Examiner*—S. Clement Swisher
*Attorney, Agent, or Firm*—Barnes, Kisselle, Raisch & Choate

[57] ABSTRACT

A temperature probe and connector for extracorporeal monitoring of blood by-passed from a patient undergoing open heart surgery which includes a conductive connector unit interposed in the by-passed blood tube and a probe removably mountable on said connector unit having a sensing element for a telethermometer, said probe assembly being manually mountable and demountable on the connector unit and designed to cooperate with the connector unit to sheath the conductive connector tube to isolate it from ambient temperature.

10 Claims, 6 Drawing Figures

U.S. Patent   May 30, 1978   Sheet 1 of 2   4,091,672
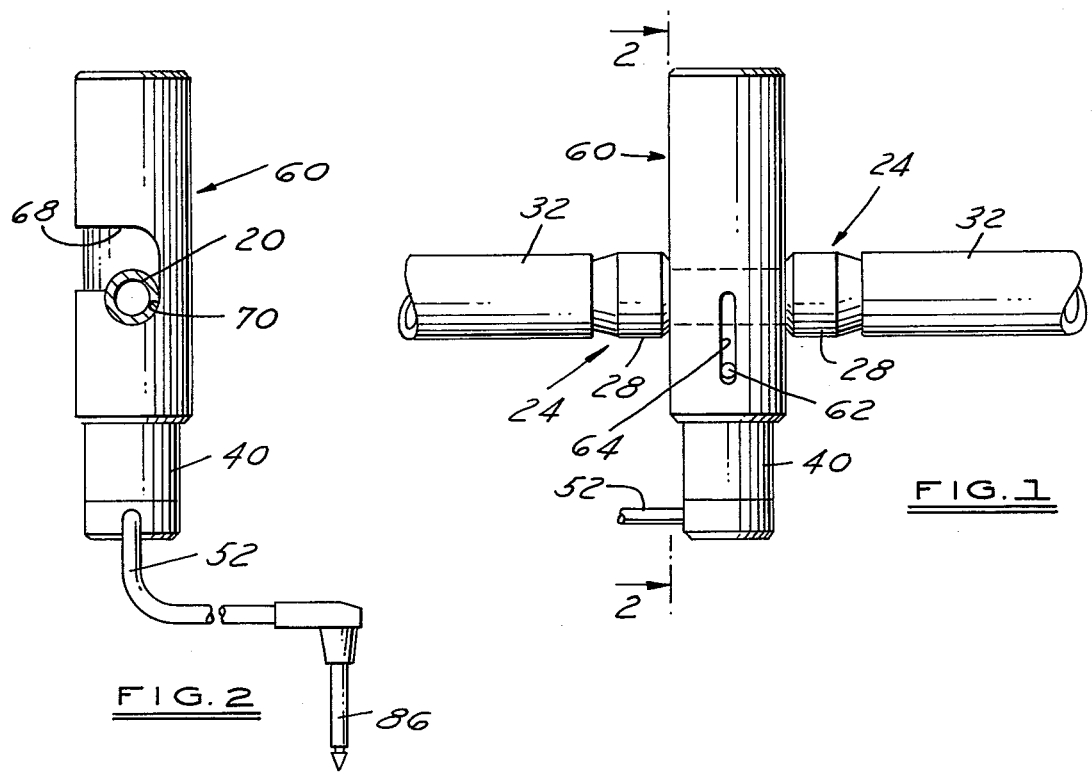
FIG.1
FIG.2
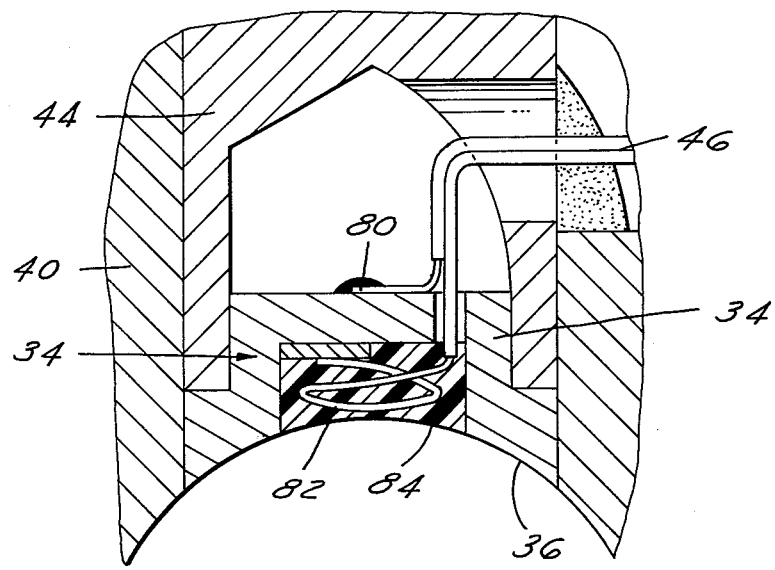
FIG.4

– 4,091,672 –

TEMPERATURE PROBE AND CONNECTOR

This invention relates to a Temperature Probe and Connector.

BACKGROUND OF INVENTION

When open heart surgery is being performed, it is necessary to by-pass the blood from the heart through extracorporeal equipment which substitutes for the patient's heart and lung action during the operation. In this process, it is necessary to maintain or control the temperature of the blood as well as to move it in a manner which simulates the human heart.

It is preferable that the blood be moved though tubes and passages which provide as little mechanical disturbance as possible; and, accordingly, it is not desirable to utilize what is called an invasive temperature probe which is inserted into the blood itself.

The present invention, therefore, contemplates a non-invasive temperature probe which can monitor the temperature of the patient's blood during an operation in connection with the extracorporeal circulation.

Inasmuch as the temperature probe does not come into direct contact with the bloodstream, it does not need to be subjected to the rigors of the sterilization process, and this eliminates also the time and expense required for such sterilization. A disposable temperature transmitting tube can be interposed into a by-pass tube for contact with the reading device.

OBJECTS OF THE PRESENT INVENTION

It is, therefore, an object of the present invention to provide a temperature probe in the form of a reusable device which cooperates with a disposable connector in a manner to obtain accurate readings of the blood temperature without disturbing the flow.

Another object is to provide a temperature probe which can be readily applied by the persons attending the extracorporeal equipment and which can be used with available accurate telethermometers which are presently available.

A further object is the provision of a connector which insures positive contact with a sensing element and with one which is readily released and removed when the operation is complete.

Other objects and features of the invention will be apparent in the following description and claims in which the principles of the invention are set forth together with details to enable a person skilled in the art to practice the invention, all in connection with the best mode presently contemplated.

DESCRIPTION OF DRAWING FIGURES

DRAWINGS accompany the disclosure and the various views thereof may be briefly described as:

FIG. 1, a side elevation of a temperature probe and connector in operative position.

FIG. 2, a view of the assembly taken on line 2—2 of FIG. 1.

FIG. 3, a sectional view of the temperature probe assembly.

FIG. 4, an enlarged section illustrating in greater detail the sensing element of the device.

Figure 5:
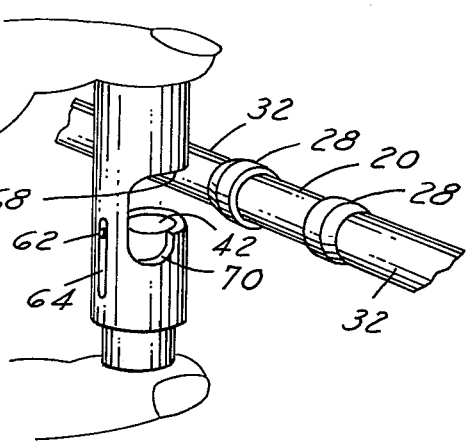

FIG. 5, a view showing the manner in which the temperature probe is assembled and removed.

Figure 6:
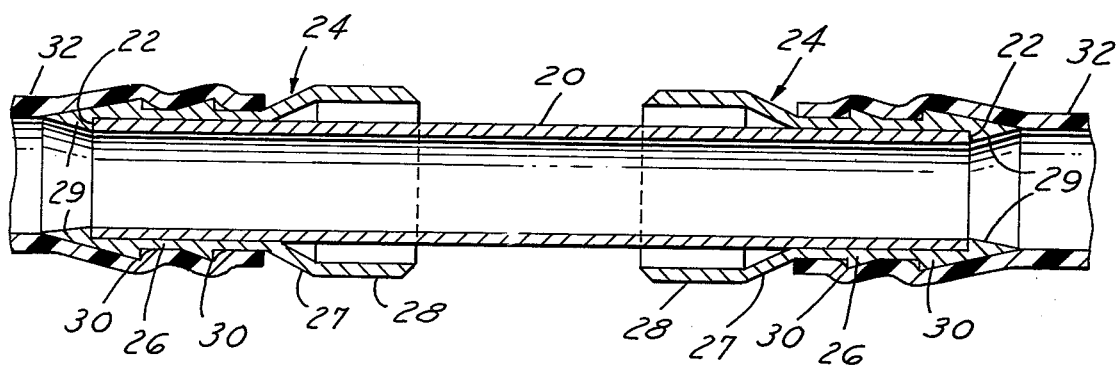

FIG. 6, a sectional view of a connector element utilized with the probe.

With reference to the drawings, in FIGS. 5 and 6, the connector tube 20 is shown, this being a straight tube formed of a metal with high heat conductive characteristics such as stainless steel or silver, this tube having squared ends 22 which will be shielded as later indicated to reduce restriction to blood flow. The tube in the example shown has a preferred length of about 3 inches with an inside diameter of about 0.355 inch and is made of stainless steel.

The wall thickness of the tube is preferably about 0.009 inch and at each end of the tube are molded plastic connector fittings 24 having a portion 26 telescoped over the end of the tube, this portion flaring outwardly at 27 to a skirt portion 28. The connector portion 26 has flared ridges 30 to cooperate with tubing 32 which has a ⅜ inch inside diameter. The connector elements 24 are preferably molded from nylon and cemented to the tube 20. The skirts 28 are spaced from the tube to provide a protective portion with an air space which reduces temperature transfer from the ambient atmosphere and the space between the skirt portions 28 is such that it is substantially occupied by the probe element when in place. The ends 29 of these connector fittings opposite the skirt 28 are shaped to overlie the square ends of the metal tube 20 to provide a flared inlet and outlet of the tube for a smooth flow of the bloodstream.

The temperature probe utilized with the connector tube 20 is a reusable device which has within it a highly conductive sensing element or button 34 preferably formed of silver with 5% nickel which is commonly called "coin" silver. This button has a cylindrical concavity 36 which fits the tube 20. The cylindrical concavity is precisely formed to insure a positive and close fit between the button and the metal tube 20. The roundness of the tube is also carefully controlled to avoid poor contact.

The sensing probe 34 is mounted in a cartridge which is composed of two telescoping body members. A first inner body member 40 is composed of a cylindrical machined or molded plastic element which has an L-shaped recess 42 opening at the side of the cylinder and extending to the central portion and upward to the sensing element 34. The sensing element itself is mounted on a headed plug 44 which inserts into the end of the body member 40. Lead wires 46 connected to the sensing element 34 extend along the body 40 into an end recess 48 closed by an end plug 50 which has a lead wire sheath 52 extending therefrom. The end plugs 44 and 50 can be secured in place by an adhesive or by sonic weld or other known methods of fastening plastic elements to each other. A second body member 60 has a telescoping relationship with the first body member 40. The circumferential orientation of the two elements is maintained by a pin 62 operating in a slot 64 in the wall of body member 60.

The second body member is closed at the top end at 66 and also has an L-shaped or bayonet slot opening which enters the body at 68 in the side wall and moves downwardly at 70. Each of these legs of the L-shaped slots is dimensioned to accept the connector tube 20. A coil spring 72 is positioned between the top 66 and the top end of the first body member 40 to urge the parts to the position shown in FIG. 3. By pressing the two parts together between the thumb and forefinger as shown in FIG. 5, the side legs of the L-shaped slots come into registry so that the tube 32 may be inserted into the probe element between the skirt portions 28. When released, the spring 72 will force the elements apart and trap the tube 20 in place as shown in FIGS. 1, 2 and 3.

As shown in greater detail in FIG. 4, the sensing element 34 consists of a stepped diameter member which has an electrical contact at 80 and a second sensing wire 82 embedded in an insert 84 formed of conductive epoxy. The lead wires 46 extending to the sheath 52 are connected ultimately to a plug-in jack 86 which will plug into a standard telethermometer which is electrically operated to indicate the temperatures at the sensor element. A suitable instrument for this probe is that made by Yellow Springs Instrument Co. (Yellow Springs, Ohio) #400 Series Probe.

These devices are generally used for a temperature range between 10° C. and 50° C. Since the body elements 40 and 60 are made of a plastic material which is relatively non-conductive when they are installed on the connector tube 20, this tube is practically entirely sheathed between skirt portions 28 of the connectors 24 and the temperature probe bodies. Thus, it is insulated from ambient temperature to increase the accuracy of the reading.

It will thus be seen that there is an important cooperation between the connector tube 20 with the end connectors 24 and the probe sensing element carried in the telescoping bodies 40 and 60. The sensing element 20, since it is in contact with the blood of a patient, is preferably a disposable item along with the tubes with which it is used. The probe element, however, may be reused over and over again.

I claim:

1. A non-invasive temperature probe for monitoring blood temperature in extracorporeal circulation system which comprises:
   (a) a connector tube formed of metal with a relatively high heat transfer characteristic adapted to be connected into an extracorporeal blood line,
   (b) a temperature probe for connection to a telethermometer comprising a highly conductive metal sensing element shaped on one surface in a cylindrical concavity to match the outer diameter of the connector tube, and a lead wire connected to said sensing element for connection to a telethermometer, and
   (c) means to mount said sensing element on said tube comprising a first body member having a transverse recess adjacent said sensing element and a second body member movably associated with said first body member having portions to contact said connector tube to urge said tube into contact with said sensing element.

2. A non-invasive temperature probe as defined in claim 1 in which said connector tube has plastic fittings on each end thereof to facilitate connection to flexible tubing, each fitting having a skirt portion surrounding the connector tube and extending toward the center of the tube to shield the tube from ambient temperature.

3. A non-invasive temperature probe as defined in claim 1 in which said first body member comprises a cylindrical plastic element having an L-shaped recess opening at one end of the L to the side of the body and at the other end of the L to said sensing element, and said second body member has a telescoping slidable relation to said first body member, said second body member having a wall recess to admit said connector tube to said L-shaped recess when said body members are moved to a relative position to register said recesses, and means to urge said body members in a non-registering position of said recesses.

4. A non-invasive temperature probe as defined in claim 3 in which said second body member has opposed retaining notches joining said wall recess shaped to fit the walls of said connector tube.

5. A non-invasive temperature probe as defined in claim 1 in which said lead wire connects said sensing element at end of said first body member to an outlet wire at the opposite end of said first body member.

6. A non-invasive temperature probe as defined in claim 3 in which said second body member has an end recess in one end, and a coil spring in said recess bearing at one end against the end of said second body member and at the other end against one end of said first body member.

7. A non-invasive temperature probe for monitoring blood temperature in extracorporateal circulation system which comprises:
   (a) a pair of telescoping first and second body members each having a pair of L-shaped recesses with a registering longitudinal leg and a horizontal leg registering in one position of said member and in non-registry in a second position,
   (b) means to urge said members to the non-registry position, and
   (c) a temperature probe sensing element in one of said body members adjacent said longitudinal leg of said body members shaped to lie in contact with a connector tube when said tube in inserted into said recesses when said horizontal recesses are in registry.

8. A connector tube for an extracorporeal blood monitoring system which comprises a metal tube of relatively high heat conductivity and a plastic connector on each end of said tube for the connection of flexible conduits to said tube, each said connector having a flared end to overlie the tube end to provide a smooth flow surface from tube to conduit.

9. A connector tube as defined in claim 8 in which the ends of the connectors opposite the flared ends are formed as skirt portions spaced from the outer walls of said tube.

10. A connector tube for an extracorporeal blood monitoring system comprising a metal tube of relatively high heat conductivity and a plastic connector on each end of said tube having tube connector nipples extending away from the central portion of said tube and skirt portions spaced from the outer walls of said tube and extending toward the central portion of said tube.

* * * * *